(12) United States Patent
Park et al.

(10) Patent No.: US 9,179,455 B2
(45) Date of Patent: Nov. 3, 2015

(54) METHODS AND ARRANGEMENTS FOR FREQUENCY SELECTIVE TRANSMISSION

(71) Applicant: Intel Corporation, Santa Clara, CA (US)

(72) Inventors: Minyoung Park, Portland, OR (US); Thomas J. Kenney, Portland, OR (US); Eldad Perahia, Portland, OR (US); Shahrnaz Azizi, Cupertino, CA (US); Adrian P. Stephens, Cambridge (GB)

(73) Assignee: INTEL CORPORATION, Santa Clara, CA (US)

( * ) Notice: Subject to any disclaimer, the term of this patent is extended or adjusted under 35 U.S.C. 154(b) by 67 days.

(21) Appl. No.: 13/730,997

(22) Filed: Dec. 29, 2012

(65) Prior Publication Data

US 2014/0098724 A1 Apr. 10, 2014

Related U.S. Application Data

(60) Provisional application No. 61/710,400, filed on Oct. 5, 2012.

(51) Int. Cl.
| | | |
|---|---|---|
| *G08C 17/00* | (2006.01) | |
| *H04W 72/04* | (2009.01) | |
| *H04W 72/02* | (2009.01) | |

(52) U.S. Cl.
CPC ............ *H04W 72/042* (2013.01); *H04W 72/02* (2013.01)

(58) Field of Classification Search
CPC .................................................... H04W 74/04
USPC ........................................................ 370/311
See application file for complete search history.

(56) References Cited

U.S. PATENT DOCUMENTS

| 6,138,019 A * | 10/2000 | Trompower et al. .......... 455/436 |
| 2007/0230423 A1* | 10/2007 | Yoshida et al. ............... 370/338 |
| 2008/0013599 A1 | 1/2008 | Malladi |
| 2011/0044392 A1* | 2/2011 | Maltsev et al. ............... 375/260 |
| 2011/0075759 A1 | 3/2011 | Seok |
| 2011/0158216 A1* | 6/2011 | Zaks ............................. 370/338 |
| 2012/0201315 A1 | 8/2012 | Zhang et al. |
| 2013/0022083 A1* | 1/2013 | Vasseur et al. ................ 375/132 |

OTHER PUBLICATIONS

International Search Report and Written Opinion received for PCT Patent Application No. PCT/US2013/048828, mailed Oct. 22, 2013, 17 pages.
Park et al., "AP Assisted Medium Synchronization", IEEE802.11-12/0840r0, Jul. 16, 2012, 16 pages.
Choi et al., "Listen Interval for Sensor Devices", 802.11-12/0618r0, May 14, 2012, 10 pages.

* cited by examiner

*Primary Examiner* — Wei Zhao
(74) *Attorney, Agent, or Firm* — Kacvinsky Daisak Bluni PLLC

(57) ABSTRACT

Logic may comprise hardware and/or code to select a narrow band from a wider channel bandwidth. Logic of communications between devices may select, e.g., a 1 or 2 MHz sub-channel from a wider channel bandwidth such as 4, 8, and 16 MHz and transmit packets on the selected 1 or 2 MHz channel. For instance, a first device may comprise an access point and a second device may comprise a station such as a low power sensor or a meter that may, e.g., operate on battery power. Logic of the devices may facilitate a frequency selective transmission scheme. Logic of the access point may transmit sounding packets or control frames across the sub-channels of the wide bandwidth channel, facilitating selection by the stations of a sub-channel and subsequent communications on the sub-channel between the access point and the station.

39 Claims, 8 Drawing Sheets

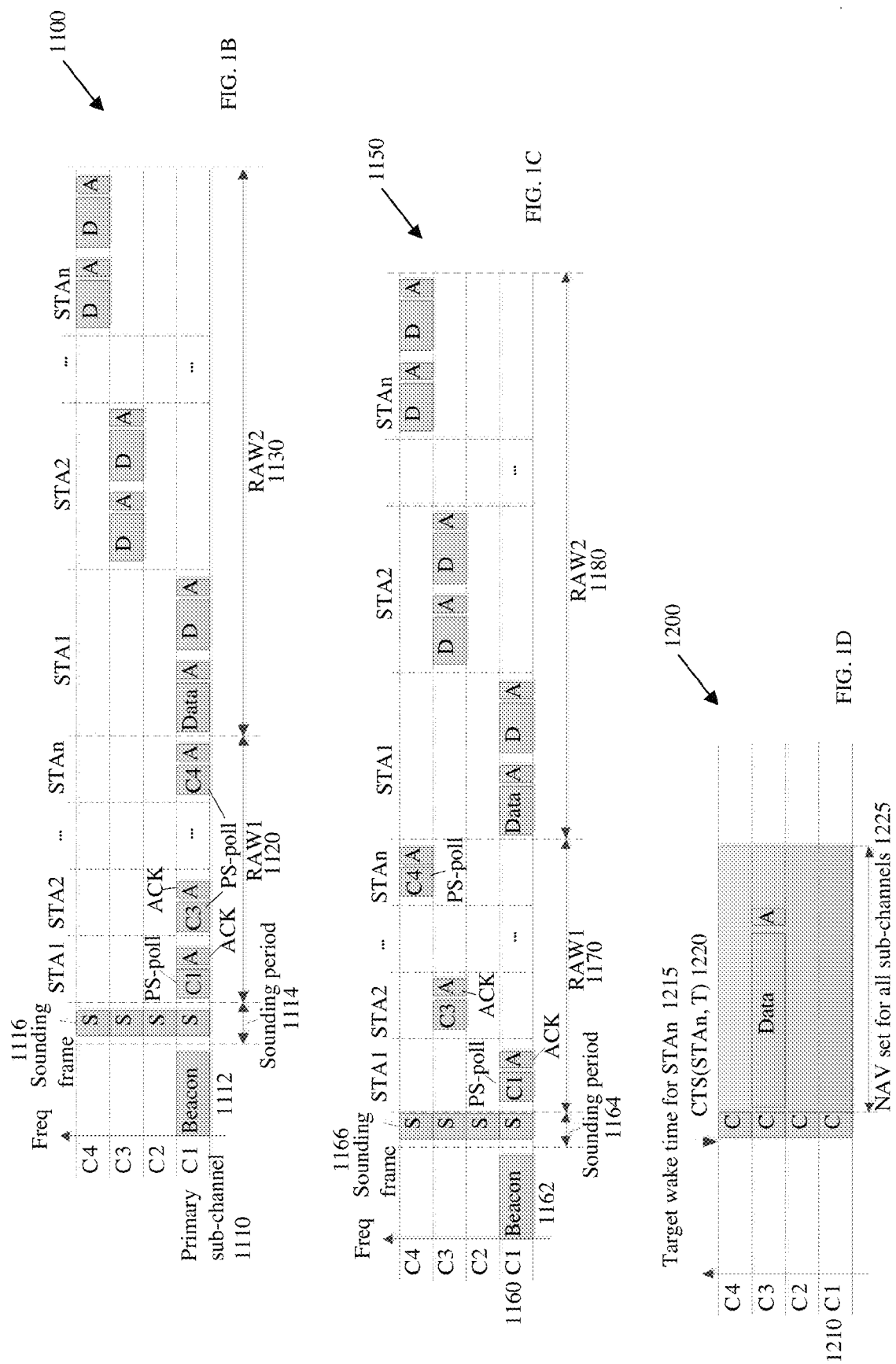

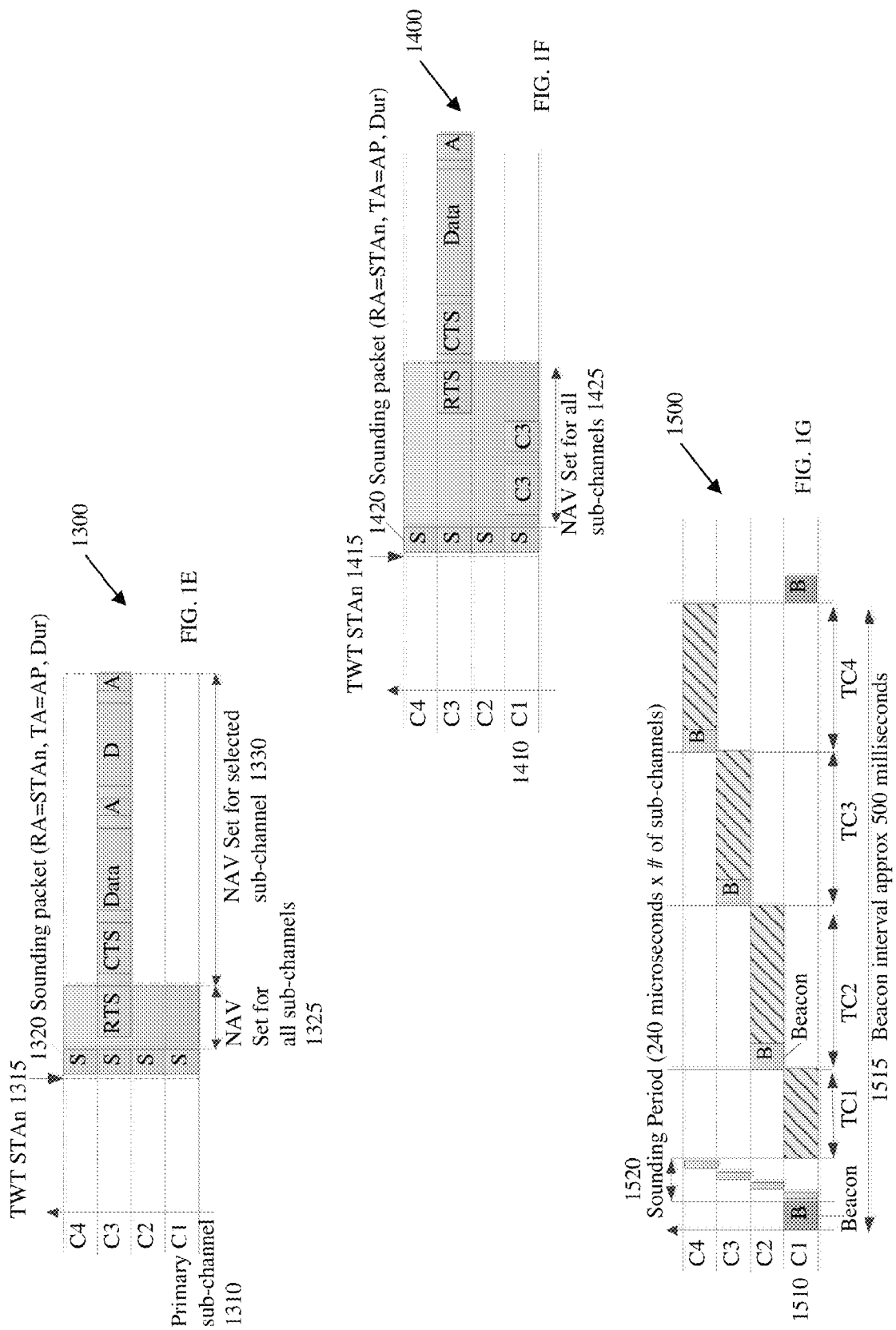

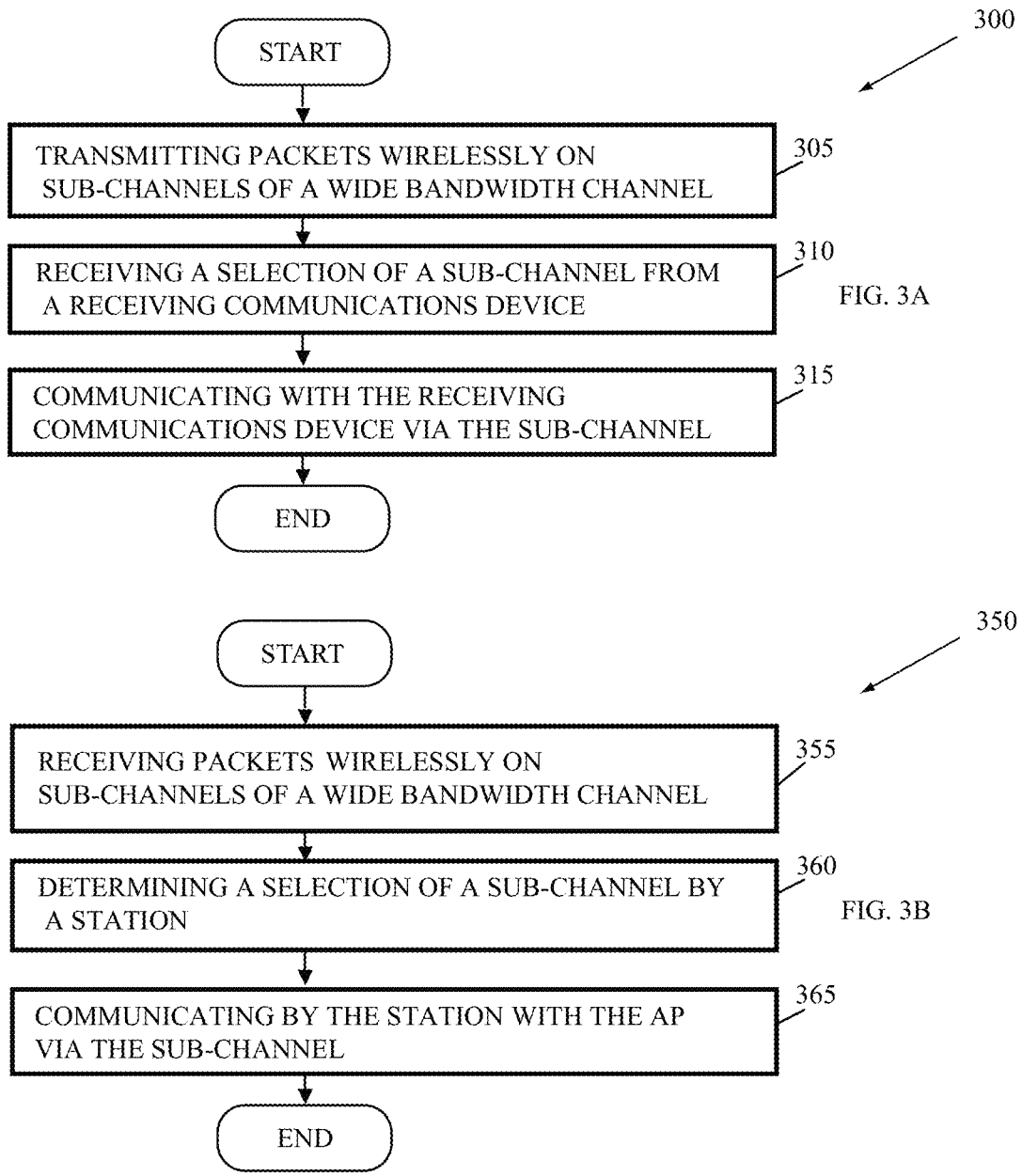

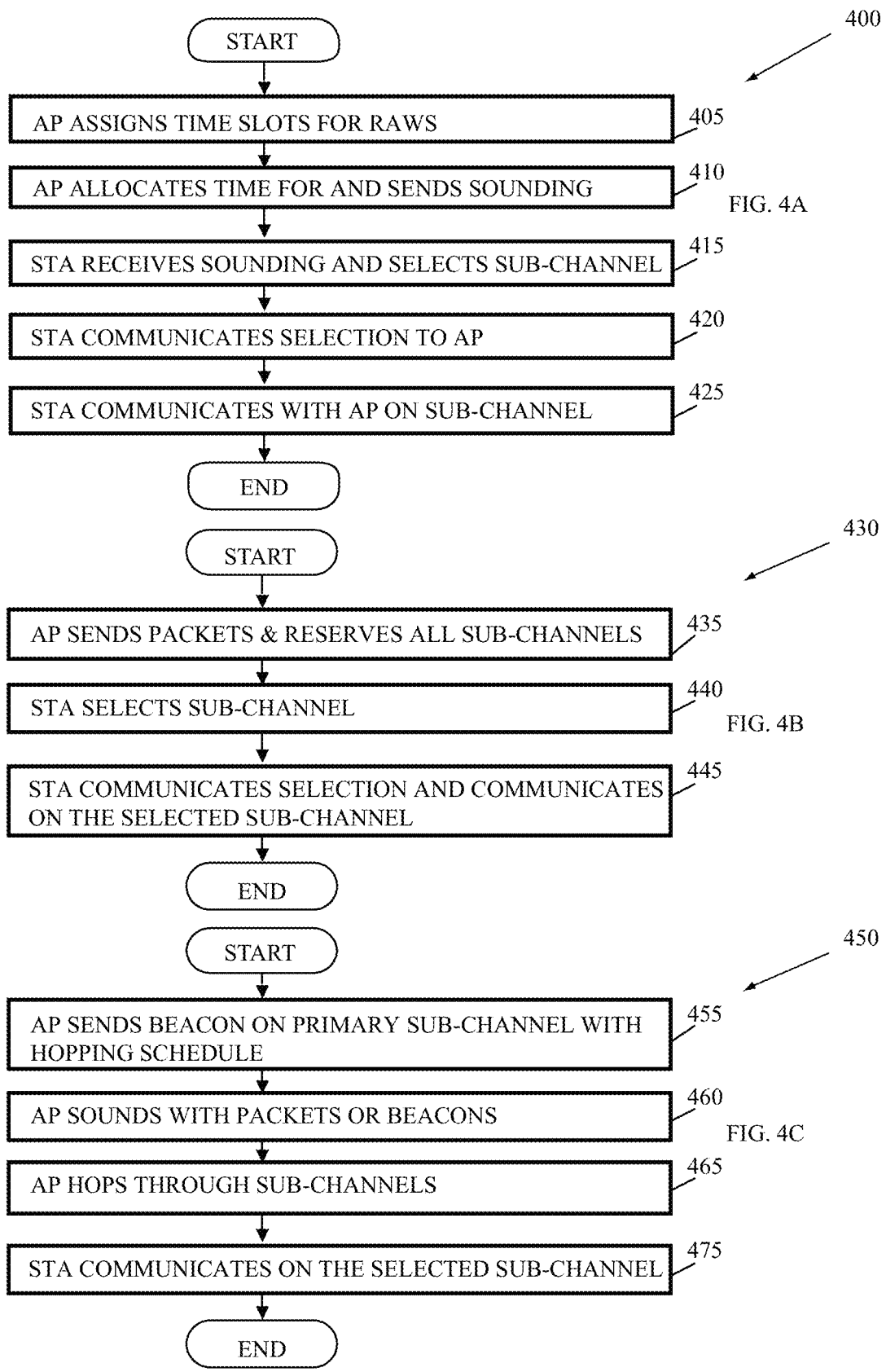

METHODS AND ARRANGEMENTS FOR FREQUENCY SELECTIVE TRANSMISSION

BACKGROUND

The present disclosure relates generally to the field of wireless communications technologies. More particularly, the present disclosure relates to frequency selective transmission communications.

BRIEF DESCRIPTION OF THE DRAWINGS

FIG. 1B depicts an embodiment of a timing diagram for Frequency selective transmission for restricted access window (RAW) based channel access;

FIG. 1C depicts an alternative embodiment of a timing diagram for a second frequency selective transmission scheme for RAW based channel access;

FIG. 1D depicts an alternative embodiment of a timing diagram a third frequency selective transmission scheme for target wake time (TWT) based channel access;

FIG. 1E depicts an alternative embodiment of a timing diagram a fourth frequency selective transmission scheme for TWT based channel access;

FIG. 1F depicts an alternative embodiment of a timing diagram a fifth frequency selective transmission scheme for TWT based channel access;

FIG. 1G depicts an alternative embodiment of a timing diagram a sixth frequency selective transmission scheme for AP cycling (or hopping) across sub-channels periodically;

FIGS. 3A-B depict embodiment of flowcharts for frequency selective transmission as discussed in conjunction with FIGS. 1-2; and FIGS. 4A-C depict embodiment of flowcharts for frequency selective transmission as discussed in conjunction with FIGS. 1-2.

DETAILED DESCRIPTION OF EMBODIMENTS

Figure 1:
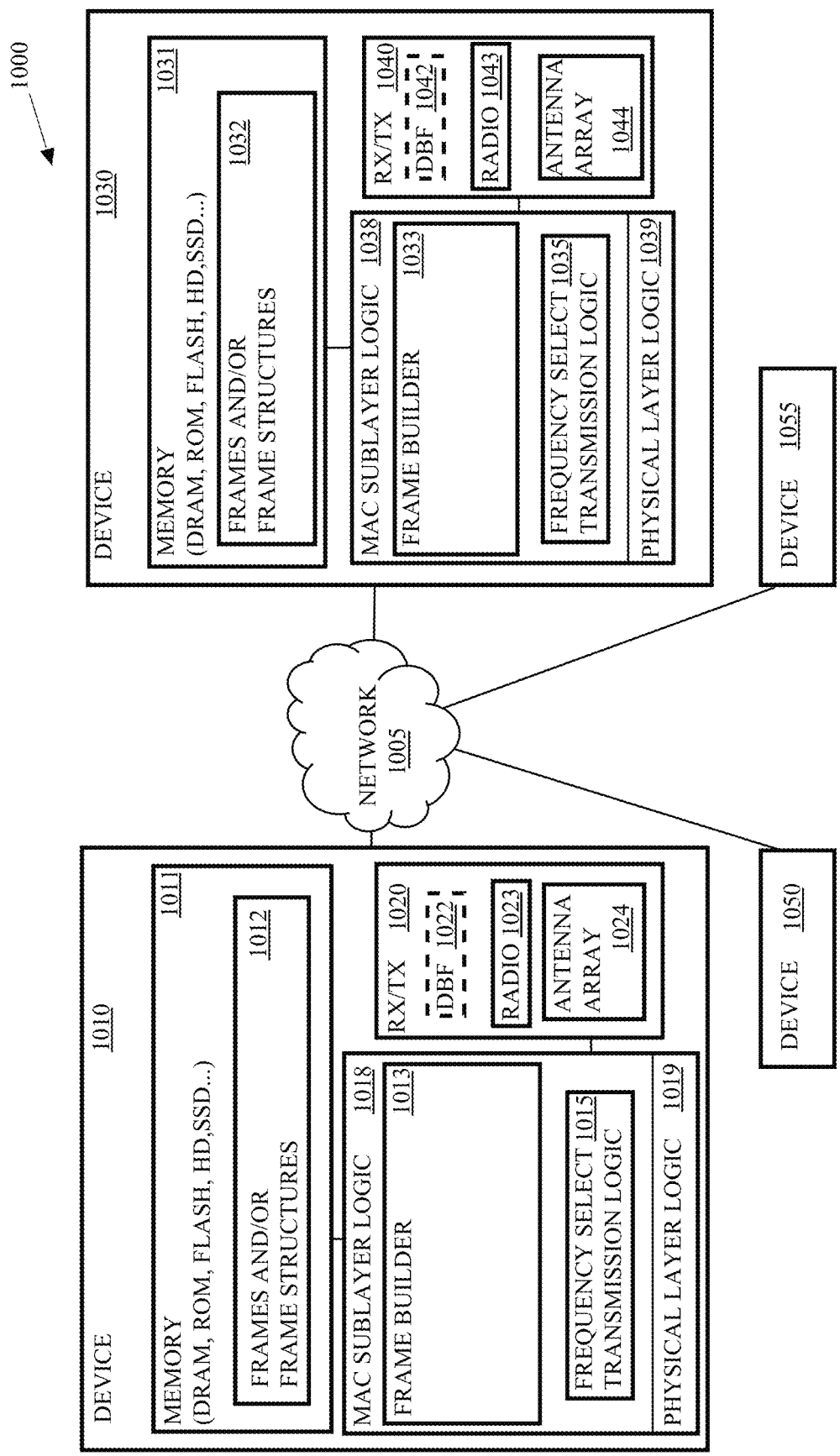
FIG. 1 depicts an embodiment of a wireless network comprising a plurality of communications devices, including multiple fixed or mobile communications devices.

The following is a detailed description of novel embodiments depicted in the accompanying drawings. However, the amount of detail offered is not intended to limit anticipated variations of the described embodiments; on the contrary, the claims and detailed description are to cover all modifications, equivalents, and alternatives as defined by the appended claims. The detailed descriptions below are designed to make such embodiments understandable and obvious to a person having ordinary skill in the art.

Generally, embodiments for frequency selective transmission communications are described herein. Embodiments may comprise logic such as hardware and/or code to select a narrow band from a wider channel bandwidth. In some embodiments, communications between devices may select, e.g., a 1 or 2 MHz sub-channel from a wider channel bandwidth such as 4, 8, and 16 MHz and transmit packets on the selected 1 or 2 MHz channel. In further embodiments, the 16 MHz channel bandwidth can be split into two 8 MHz sub-channels or four 2 MHz sub-channels and, in other embodiments, the 8 MHz channel bandwidth can be split into two 4 MHz channels. Embodiments are not limited to 1 or 2 MHz sub-channels. In some embodiments, for instance, a first device may comprise an access point and a second device may comprise a station such as a low power sensor or a meter that may, e.g., operate on battery power. In further embodiments, logic of the devices may facilitate a frequency selective transmission scheme. In several embodiments, the access point may transmit sounding packets or control frames across the sub-channels of the wide bandwidth channel, facilitating selection by the stations of a sub-channel and subsequent communications on the sub-channel between the access point and the station.

In some embodiments, the access point may implement a restricted access window scheme in which devices are assigned to time slots for selection of a sub-channel via a power saving poll or other trigger frame. In other embodiments, the stations may implement a target wake time for devices such as devices that wait much longer than beacon intervals to wake to communicate with an access point. In still other embodiments, the access point may transmit a hopping schedule, which describes time slots during which the access point will remain on each sub-channel, to the stations in a beacon and then hop between each of the sub-channels during the beacon interval. Such embodiments allow the stations to hop between the sub-channels to determine whether communication quality on the sub-channel is acceptable.

Various embodiments may be designed to address different technical problems associated with improving narrow channel bandwidth communications. For instance, some embodiments may be designed to address one or more technical problems such as increasing the number of channels with narrow channel bandwidths. The technical problem of coordinating the selection of channels with narrow channel bandwidths.

Different technical problems such as those discussed above may be addressed by one or more different embodiments. For instance, some embodiments that are designed to address increasing the number of channels with narrow channel bandwidths may do so by one or more different technical means such as sub-dividing a channel with a wider channel bandwidth into multiple sub-channels. Further embodiments that are designed to coordinate the selection of channels with narrow channel bandwidths may do so by one or more different technical means such as establishing restricted access windows for selection of a sub-channel of a wider channel bandwidth and communication via the sub-channels, establishing target wake times for devices that wait longer time periods between communications, establishing a hopping schedule with time slots during which the access point may remain on a sub-channel for channel selection and communications, and/or the like. Further embodiments that may establish time slots within beacon intervals.

Some embodiments implement a one Megahertz (MHz) channel bandwidth for Institute of Electrical and Electronic Engineers (IEEE) 802.11ah systems. The lowest data rate in such embodiments may be approximately 6.5 Megabits per second (Mbps) divided by 20=325 Kilobits per second (Kbps). If two times repetition coding is used, the lowest data rate drops to 162.5 Kbps. In many embodiments, the lowest PHY rate is used for beacon and control frame transmissions. Many embodiments may enable small battery-powered wireless devices (e.g., sensors) to use Wi-Fi to connect to the, e.g., Internet with very low power consumption.

Some embodiments may take advantage of Wireless Fidelity (Wi-Fi) network ubiquity, enabling new applications that often require very low power consumption, among other unique characteristics. Wi-Fi generally refers to devices that implement the IEEE 802.11-2007, IEEE Standard for Information technology—Telecommunications and information exchange between systems—Local and metropolitan area networks—Specific requirements—Part 11: Wireless LAN Medium Access Control (MAC) and Physical Layer (PHY) Specifications (http://standards.ieee.org/getieee802/download/802.11-2007.pdf) and other related wireless standards.

Several embodiments comprise access points (APs) for and/or client devices of APs or stations (STAs) such as routers, switches, servers, workstations, netbooks, mobile devices (Laptop, Smart Phone, Tablet, and the like), as well as sensors, meters, controls, instruments, monitors, appliances, and the like. Some embodiments may provide, e.g., indoor and/or outdoor "smart" grid and sensor services. For example, some embodiments may provide a metering station to collect data from sensors that meter the usage of electricity, water, gas, and/or other utilities for a home or homes within a particular area and wirelessly transmit the usage of these services to a meter substation. Further embodiments may collect data from sensors for home healthcare, clinics, or hospitals for monitoring healthcare related events and vital signs for patients such as fall detection, pill bottle monitoring, weight monitoring, sleep apnea, blood sugar levels, heart rhythms, and the like. Embodiments designed for such services generally require much lower data rates and much lower (ultra low) power consumption than devices provided in IEEE 802.11n/ac systems.

Logic, modules, devices, and interfaces herein described may perform functions that may be implemented in hardware and/or code. Hardware and/or code may comprise software, firmware, microcode, processors, state machines, chipsets, or combinations thereof designed to accomplish the functionality.

Embodiments may facilitate wireless communications. Some embodiments may comprise low power wireless communications like Bluetooth®, wireless local area networks (WLANs), wireless metropolitan area networks (WMANs), wireless personal area networks (WPAN), cellular networks, communications in networks, messaging systems, and smart-devices to facilitate interaction between such devices. Furthermore, some wireless embodiments may incorporate a single antenna while other embodiments may employ multiple antennas. The one or more antennas may couple with a processor and a radio to transmit and/or receive radio waves. For instance, multiple-input and multiple-output (MIMO) is the use of radio channels carrying signals via multiple antennas at both the transmitter and receiver to improve communication performance.

While some of the specific embodiments described below will reference the embodiments with specific configurations, those of skill in the art will realize that embodiments of the present disclosure may advantageously be implemented with other configurations with similar issues or problems.

Turning now to FIG. 1, there is shown an embodiment of a wireless communication system 1000. The wireless communication system 1000 comprises a communications device 1010 that may be wire line and wirelessly connected to a network 1005. The communications device 1010 may communicate wirelessly with a plurality of communication devices 1030, 1050, and 1055 via the network 1005. The communications device 1010 may comprise an access point.

The communications device 1030 may comprise a low power communications device such as a sensor, a consumer electronics device, a personal mobile device, or the like. And communications devices 1050 and 1055 may comprise sensors, stations, access points, hubs, switches, routers, computers, laptops, netbooks, cellular phones, smart phones, PDAs (Personal Digital Assistants), or other wireless-capable devices. Thus, communications devices may be mobile or fixed. For example, the communications device 1010 may comprise a metering substation for water consumption within a neighborhood of homes. Each of the homes within the neighborhood may comprise a sensor such as the communications device 1030 and the communications device 1030 may be integrated with or coupled to a water meter usage meter.

The communications devices 1010, 1030, 1050, and 1055 may be capable of one or more frequency selective transmission schemes or communications via frequency selective transmission logic such as frequency selective transmission logic 1015 and 1035, and the frequency selective transmission logic 1015 of communications device 1010 may select one or more frequency selective transmission protocols based upon capabilities determined about the communications devices 1030, 1050, and 1055 during association with the communications device 1010. Various other embodiments of frequency selective transmission protocols and components thereof implemented by frequency selective transmission logic such as frequency selective transmission logic 1015 and 1035 are illustrated in FIGS. 1B-1J.

Initially, for example, the communications devices 1030, 1050, and 1055 may receive a beacon from communications device 1010. In some embodiments, the beacon may comprise assignments for the communications devices 1030, 1050, and 1055 of time slots to communicate with communications device 1010. The communications device 1010 may allocate a time slot for sounding. The sounding packets may be transmitted over all sub-channels of a wide channel bandwidth. For instance, a 4 MHz channel may have two 2 MHz sub channels or four 1 MHz sub-channels. A 16 MHz bandwidth may comprise four 4 MHz channels, eight 2 MHz channels or sixteen 1 MHz sub-channels.

The frequency selective transmission logic, such as the frequency selective transmission logic 1035, of communications devices 1030, 1050, and 1055 may receive the sounding packets or control frames during the sounding period and the frequency selective transmission logic each of the communications devices 1030, 1050, and 1055 may select a sub-channel for communications with communications device 1010.

In some embodiments, the frequency selective transmission logic of each of the communications devices 1030, 1050, and 1055 may transmit a power-saving poll (PS-Poll) or other trigger frame during a PS-Poll/trigger phase in a first restricted access window (RAW1). In response, the communications device 1010 may receive the PS-Poll or other trigger frames from the communications devices 1030, 1050, and 1055 during RAW1. In some embodiments, the PS Polls or other trigger frames may comprise sub-channel indexes to indicate the particular sub-channel selected by the communications device. The frequency selective transmission logic 1015 may record the selected sub-channel indexes in memory 1011 for each of the communications devices 1030, 1050, and 1055.

During a data exchange phase (RAW2), the communications devices 1030, 1050, and 1055 may communicate with the communications device 1010 during their respective, assigned time slots. For instance, a frame builder 1033 of communications device 1030 may generate or select a frame based upon a frame structure 1032 in memory 1031 of communications device 1030. The medium access control (MAC) sublayer logic 1038 may communicate with the physical layer (PHY) logic 1039 to transmit the frame to the PHY logic 1039 of communications device 1030.

In further embodiments, the communications devices 1030, 1050, and 1055 may communicate with the communications device 1010 on the selected sub-channel and such communication may inform the communications device 1010 of the selected sub-channel for communications by the particular communications device at least for the particular beacon interval.

Figure 1A:
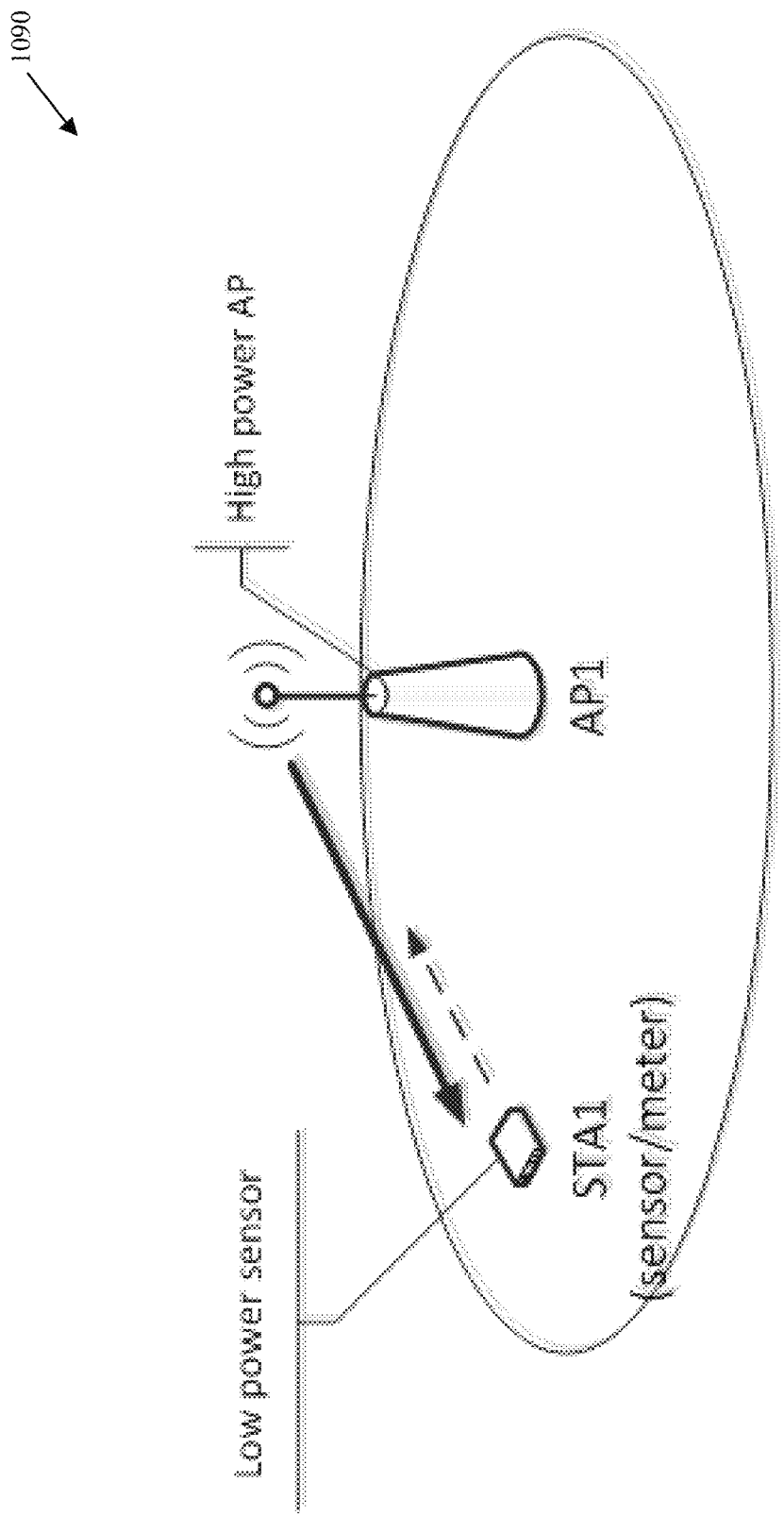
FIG. 1A depicts an alternative embodiment of a wireless network comprising an access point (AP) and a station (STA)

FIG. 1A illustrates an alternative embodiment of a wireless network 1090 comprising an access point (AP1) and a station (STA1). In this embodiment, the AP1 may comprise a high-powered communications device and the STA1 may comprise battery-powered sensor or meter that collects data and wakes periodically to transmit the data to the AP1. In the present embodiment, the AP1 may establish a frequency selective transmission protocol with the STA1 based upon the capabilities of the STA1. In particular, the STA1 may be capable of receiving a narrow bandwidth communication. In such embodiments, the AP1 may establish a sounding duration to transmit sounding packets transmitted across all sub-channels sequentially to facilitate selection of the sub-channel by the STA1. In other embodiments, the STA1 may be capable of receiving wideband transmissions and the AP1 may transmit all the sounding packets transmitted across all sub-channels simultaneously. In further embodiments, the AP1 may transmit all the sounding packets transmitted across all sub-channels simultaneously multiple times.

FIG. 1B depicts an embodiment of a timing diagram 1100 for frequency selective transmission for reserved access window (RAW) based channel access. In this embodiment, the AP may assign time slots to STAs through a beacon 1112 transmitted on a primary channel (C1) 1110 for, e.g., two RAWs. The AP may allocate the first RAW (RAW1 1120) for sub-channel selection and, in some embodiments, may be referred to as the PS-Poll/trigger phase. The AP may allocate the second RAW phase (RAW2 1130) for data exchange between the AP and the STAs and this phase may be referred to as the data exchange phase.

Figure 1H:
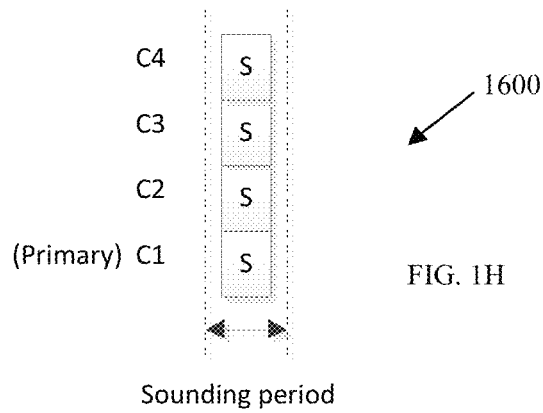
FIG. 1H depicts an embodiment of Sounding packets transmitted across all sub-channels simultaneously.
Figure 1I:
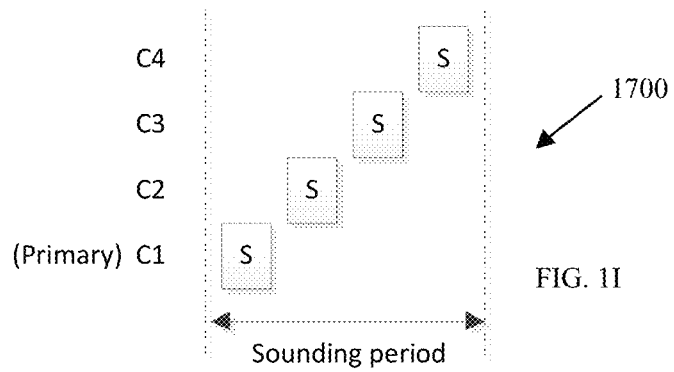
FIG. 1I depicts an alternative embodiment of Sounding packets transmitted across all sub-channels sequentially.

With the beacon 1112, the AP may also allocate a time slot for a sounding period 1114. The time slot for the sounding period may be reserved for a time duration of T to facilitate receipt of the sounding packets 1116 by the STAs. The AP may send the sounding packets 1116 over all sub-channels (e.g., four 2 MHz channels in the present embodiment) at the same time or sequentially. The STAs may receive the sounding packets 1116 during the sounding period 1114 and each STA may choose a sub-channel (C1, C2, C3 or C4). The STAs can receive the sounding packets 1116 across all sub-channels (C1, C2, C3 and C4) sequentially by switching between the sub-channels (C1, C2, C3 and C4) or, if the AP transmits the sounding packets 1116 simultaneously such as is illustrated in FIG. 1H or 1I, the STAs may be capable of receiving the sounding packets 1116 across all sub-channels at the same time.

After transmitting the beacon 1112 with the time slot allocations for the RAW1 1120 and RAW2 1130, each STA may communicate with the AP during the time slot assigned to the STA during each of the phases 1120 and 1130. The time slot assignments in the present embodiments are demarked in FIG. 1B by the STA number above each time slot such as STA1, STA2 through STAn for N stations. STAn denotes the Nth station.

Each STA may signal the sub-channel that the STA selected in a PS-Poll or trigger frame during the PS-Poll/trigger phase, RAW1 1120. Some embodiments, may, for instance, assume that the AP and the STAs can communicate on the primary sub-channel (C1) 1110 at the lowest modulation and coding scheme (MCS) transmission rate. The PS-Poll or other trigger frame may signal the selected sub-channel index with 2-4 bits in a field of the PS-Poll assuming a sub-channel is selected from a total of 4 to 16 sub-channels.

In many embodiments, the AP responds to the STAs PS-Poll with an acknowledgement frame on the primary sub-channel C1 1120. In the present embodiment, the STA1 transmits a PS-Poll to the AP during the RAW1 1120 with a sub-channel index indicating sub-channel C1, the STA2 transmits a PS-Poll to the AP during the RAW1 1120 with a sub-channel index indicating sub-channel C3, and the STAn transmits a PS-Poll to the AP during the RAW1 1120 with a sub-channel index indicating sub-channel C4. The AP may acknowledge the selection by responding with the acknowledgement within the time slots of RAW1 1120 for STA1, STA2, and STAn, respectively.

The AP records the selected sub-channel index for each STA and uses that selected sub-channel for data exchanges during the corresponding assigned time slots in the data exchange phase, RAW2 1130. For instance, the STA1 transmits two data packets during the time slot for STA1 and receives an ACK transmitted from the AP after each data packet transmission. The sounding period may represent an additional overhead for this frequency selective transmission protocol.

In further embodiments, the communications device 1010 may facilitate data offloading. For example, communications devices that are low power sensors may include a data offloading scheme to, e.g., communicate via Wi-Fi, another communications device, a cellular network, or the like for the purposes of reducing power consumption consumed in waiting for access to, e.g., a metering station and/or increasing availability of bandwidth. Communications devices that receive data from sensors such as metering stations may include a data offloading scheme to, e.g., communicate via Wi-Fi, another communications device, a cellular network, or the like for the purposes of reducing congestion of the network 1005.

The network 1005 may represent an interconnection of a number of networks. For instance, the network 1005 may couple with a wide area network such as the Internet or an intranet and may interconnect local devices wired or wirelessly interconnected via one or more hubs, routers, or switches. In the present embodiment, network 1005 communicatively couples communications devices 1010, 1030, 1050, and 1055.

The communication devices 1010 and 1030 comprise memory 1011 and 1031, and MAC sublayer logic 1018 and 1038, respectively. The memory 1011 and 1031 may comprise a storage medium such as Dynamic Random Access Memory (DRAM), read only memory (ROM), buffers, registers, cache, flash memory, hard disk drives, solid-state drives, or the like. The memory 1011 and 1031 may store the frames and/or the frame structures such as standard frame structures identified in IEEE 802.11.

FIG. 1C illustrates an alternative embodiment of a timing diagram 1150 for a second frequency selective transmission scheme for reserved access window (RAW) based channel access. In the present embodiment, the AP may transmit a beacon 1162 to reserve a sounding period 1164 to transmit sounding packets 1166, reserve a time duration (T) for the PS-Poll/trigger phase, RAW1 1170, and assign time slots to the STAs (STA1, STA2, through STAn) for the data exchange phase, RAW2 1180.

Each STA may select a sub-channel (e.g., the best sub-channel in terms of signal to noise, signal strength, and/or other) and transmit a PS-Poll or other trigger frame on that sub-channel to identify the selected sub-channel. The STA may not need to signal the selected sub-channel index in the PS-Poll/trigger frame such as by a sub-channel index because the AP can determine the selected sub-channel by receiving the PS-Poll/trigger frame on the selected sub-channel. For instance, the STA2 may receive the sounding packets on all the sub-channels (C1, C2, C3, and C4), determine that sub-channel C3 offered the best communication characteristics, and transmit a PS-Poll frame to the AP on sub-channel C3 in the time slot for STA2 during the RAW1 1170.

The AP may record the selected sub-channel index for each STA in memory such as memory 1011 in FIG. 1 and may use that sub-channel for data exchanges (D denotes data packet and A denotes ACK in FIG. 1B) during the assigned time slot in the data exchange phase (RAW2). For instance, the STA2 selects the sub-channel C3 during RAW1 and, during RAW2 1180, the STA2 transmits data during the time slot allocated to STA2 in the RAW2 1130. The AP may respond to each data packet from the STAs with an ACK.

In several embodiments, the AP is capable of decoding a packet received on any sub-channel so that the AP can identify the sub-channels selected by the STAs based upon the sub-channel on which the STAs communicate. In such embodiments, the AP may be more capable in some respects than the AP illustrated in FIG. 1B.

FIG. 1D illustrates an alternative embodiment of a timing diagram a third frequency selective transmission scheme for target wake time (TWT) based channel access. The TWT based channel access may operate separately or in conjunction with the other embodiments described herein. In the present embodiment, the AP may transmit short clear-to-send (CTS) frames (Synch frames) across all the sub-channels (C1, C2, C3, and C4) either simultaneously or sequentially. All the sub-channels (C1, C2, C3, and C4) may be reserved for a time duration T, which may be a maximum transmission operation (TXOP) or an estimated data transmission time, to prevent possible hidden node problems until the end of the packet transactions.

The TWT 1215 illustrated may be the TWT for STAn. In other words, during association or during a beacon transmission (not shown), the AP may have assigned the TWT to STAn and the STAn may wake to receive the short CTS. The STAn may select a sub-channel C3 and send a data packet on the selected sub-channel. The AP may detect the transmission on sub-channel C3, identifying the selected sub-channel, and may decode the data packet received on the sub-channel C3. The unselected sub-channels during T may not be used because they are reserved by a network allocation vector (NAV) 1225 through the entire exchange (Data denotes data packet and A denotes ACK in FIG. 1D).

FIG. 1E illustrates an alternative embodiment of a timing diagram 1300 that is a fourth frequency selective transmission scheme and the scheme implements TWT based channel access. In the present embodiment, the AP may send sounding frames across all sub-channels either simultaneously or sequentially. Note that the illustrations include simultaneous sounding packets but other embodiments include other sounding packet arrangements such as those illustrated in FIG. 1H-J.

The AP may transmit sounding frames 1320 to a STAn at the TWT of the STAn. The sounding packets may comprise a receiver address (RA) of STAn, a transmitter address (TA) of the AP, and a NAV duration that provides sufficient time for the STAn to respond with an RTS. All the sub-channels (C1, C2, C3, and C4) may be reserved by the NAV 1325 to allow the STAn to select any of the sub-channels (C1, C2, C3, and C4).

The STAn may select the sub-channel C3 based upon characteristics of the sub-channels. Upon selecting the sub-channel C3, the STAn may transmit the RTS frame to the AP on the sub-channel C3 to identify the sub-channel C3 as the selected sub-channel and to set the NAV for the sub-channel C3 only for the remainder of the data exchange 1330. The AP may respond to the RTS with a CTS and the data exchange (D denotes data packet and A denotes ACK in FIG. 1E) may proceed thereafter.

In many embodiments, the STAn may open its reception (RX) chain only for the selected sub-channel only. The AP may also open its RX chain only for the selected sub-channel. In such embodiments, the unselected sub-channels (C1, C2, and C4) can be used by Optimal Base Station Scheduler (OBSS) STAs after the end of the RTS frame.

FIG. 1F illustrates an alternative embodiment of a timing diagram 1400 a fifth frequency selective transmission scheme and the scheme may implement TWT based channel access. In the present embodiment, the AP may send sounding frames 1420 across all sub-channels (C1, C2, C3, and C4) either simultaneously or sequentially. Note that many embodiments herein describe four sub-channels (C1, C2, C3, and C4) for illustrative purpose to clearly show compare the various embodiments, however, embodiments may comprise any number of sub-channels. The number of sub-channels in a channel with a wide channel bandwidth may be up to the wide channel bandwidth divided by the narrow channel bandwidth.

The AP may send sounding frames to a STAn at the TWT of the STAn and the sounding frames may include a NAV of a duration to reserve all the sub-channels (C1, C2, C3, and C4) for a PS-Poll/trigger frame from the STAn, an ACK (A denotes ACK in FIG. 1F) or a response frame from the AP, and an RTS from the STAn as shown in FIG. 1F. All the sub-channels may be reserved during this period of time to protect transmissions from other STAs.

The STAn may respond with the PS-Poll on the primary sub-channel 1410 and the AP may respond with an ACK or response frame on the primary sub-channel 1410. In such embodiments, the ACK or response frame may contain the selected sub-channel index. The STAn may select the sub-channel C3 based on the sounding frames 1420 and send an RTS on the selected sub-channel C3. The RTS may set other STAs' NAV on the selected sub-channel C3 and the STA may open its RX chain only for the selected sub-channel C3, potentially facilitating use of the unselected sub-channels.

In response to the RTS from the STAn, the AP may transmit a CTS on the selected channel C3 and open its RX chain only for the selected sub-channel C3. Thereafter, the AP and the STA may exchange Data and ACK frames on the selected channel C3. And the unselected sub-channels (C1, C2, and C4) can be used by OBSS STAs after transmission of the RTS frame.

FIG. 1G illustrates an alternative embodiment of a timing diagram 1500 a sixth frequency selective transmission scheme that implements AP cycling (or hopping) across sub-channels periodically. In the present embodiment, the AP may cycle through N sub-channels (e.g., C1, C2, C3, and C4) periodically. The AP may transmit a beacon at each beacon interval that may contain the AP's sub-channel 'hopping' schedule (e.g., when and how long the AP will stay on each sub-channel) and hopping schedules of OBSSs may be coordinated to better utilize sub-channels (C1, C2, C3, and C4). FIG. 1G illustrates a single beacon interval 1515.

The AP may transmit beacons demarking the beacon intervals on the primary sub-channel C1 1510. In some embodiments, a sounding period 1520 may follow a beacon or, in further embodiments, the sounding period is not included in the beacon interval and the AP, instead, transmits beacons as sounding packets on each of the sub-channels (C1, C2, C3, and C4) at the beginning of each time slot allocated for the AP to remain on the sub-channel in accordance with the hopping schedule.

A STA may estimate channel quality of each sub-channel during the sounding period or based on the beacons (B) transmitted on each of the sub-channels (C1, C2, C3, and C4). When using beacons for channel estimation, after receiving a beacon on a sub-channel and if the STA determines that the channel quality is good enough to use based on the received beacon, the STA may decide to stay on that sub-channel and access the channel. Otherwise, the STA may move on to the next sub-channel on which the AP is scheduled to stay for a duration indicated in the hopping schedule.

The STA may select a sub-channel and access the sub-channel when the AP is on that sub-channel. And the AP may adjust time durations (e.g. TC1, TC2, TC3, and TC4 in FIG. 1G) independently from each other based on the traffic loads of the sub-channels (C1, C2, C3, and C4).

Figure 1J:
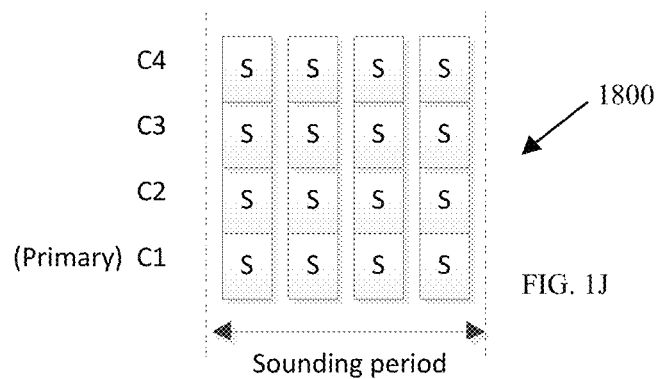
FIG. 1J depicts an alternative embodiment of Sounding packets transmitted across all sub-channels simultaneously multiple times.

FIGS. 1H-1J may illustrate different sounding options for the various frequency selective transmission schemes. FIG. 1H depicts an embodiment 1600 of sounding packets transmitted across all sub-channels (C1, C2, C3, and C4) simultaneously during the sounding period. In some embodiments, this scheme offers short sound duration. In further embodiments, the STA has to be capable to receive much wider bandwidth than it is actually using for transmission and reception (TX/RX).

FIG. 1I depicts an alternative embodiment 1700 of sounding packets transmitted across all sub-channels (C1, C2, C3, and C4) sequentially during a sounding period. In some embodiments, this scheme works with STAs without capabilities for a wider channel bandwidth than it needs for TX/RX. In further embodiments, the sounding period may be longer and the sounding packet may not be transmitted in time if one of the sub-channels becomes occupied by other packet transmissions. In other words, the interference patterns may change across the duration of a long sounding period.

FIG. 1J depicts an alternative embodiment 1800 of sounding packets transmitted across all sub-channels C1, C2, C3, and C4) simultaneously and repeatedly, multiple times. In some embodiments, this scheme allows STAs to choose whether to receive the sounding packets simultaneously or sequentially. In further embodiments, there may be no disruptions from other STAs transmissions because the sounding packets are utilizing all the sub-channels throughout the sounding period.

Referring again to FIG. 1, the MAC sublayer logic 1018, 1038 may comprise logic to implement functionality of the MAC sublayer of the data link layer of the communications device 1010, 1030. The MAC sublayer logic 1018, 1038 may generate the frames such as management frames, data frames, and control frames, and may communicate with the PHY logic 1019, 1039 to transmit the frames. The PHY logic 1019, 1039 may generate physical layer protocol data units (PPDUs) based upon the frames. More specifically, the frame builders 1013 and 1033 may generate the frames and data unit builders of the PHY logic 1019, 1039 may encapsulate the frames with preambles to generate PPDUs for transmission via a physical layer device such as the transceivers (RX/TX) 1020 and 1040.

The frame, also referred to as a MAC layer Service Data Unit (MSDU), may comprise a control frame or a management frame. For example, frame builder 1013 may generate a management frame such as the beacon frame to identify the communications device 1010 as having capabilities such as supported data rates, privacy settings, quality of service support (QoS), power saving features, cross-support, and a service set identification (SSID) of the network to identify the network to the communications device 1030. For instance, the communications devices 1010, 1030, 1050, and 1055 may be compliant with IEEE 802.11ah, which supports mandatory 1 MHz and 2 MHz channel bandwidths and optional 4 MHz, 8 MHz, and 16 MHz channel bandwidths. Although a much narrower channel bandwidth improves receiver sensitivity by 10-20 times compared to 20 MHz channel bandwidth of 802.11 in 2.4 GHz and 5 GHz bands, 1 or 2 MHz signal transmissions may experience high multipath fading loss due to much reduced frequency diversity compared to 20 MHz signal transmissions. Thus, in many embodiments, a management frame such as a beacon or an association response frame may indicate that the communications device 1010 is capable of one or more frequency selective transmission schemes that may attenuate the loss by utilizing the narrow band sub-channels within the wide bandwidth channels such as 1 MHz or 2 MHz sub-channels.

The communications devices 1010, 1030, 1050, and 1055 may each comprise a transceiver such as transceivers 1020 and 1040. Each transceiver 1020, 1040 comprises a radio 1023, 1043 comprising an RF transmitter and an RF receiver. Each RF transmitter impresses digital data onto an RF frequency for transmission of the data by electromagnetic radiation. An RF receiver receives electromagnetic energy at an RF frequency and extracts the digital data therefrom.

FIG. 1 may depict a number of different embodiments including a Multiple-Input, Multiple-Output (MIMO) system with, e.g., four spatial streams, and may depict degenerate systems in which one or more of the communications devices 1010, 1030, 1050, and 1055 comprise a receiver and/or a transmitter with a single antenna including a Single-Input, Single Output (SISO) system, a Single-Input, Multiple Output (SIMO) system, and a Multiple-Input, Single Output (MISO) system.

In many embodiments, transceivers 1020 and 1040 implement orthogonal frequency-division multiplexing (OFDM). OFDM is a method of encoding digital data on multiple carrier frequencies. OFDM is a frequency-division multiplexing scheme used as a digital multi-carrier modulation method. A large number of closely spaced orthogonal sub-carrier signals are used to carry data. The data is divided into several parallel data streams or channels, one for each sub-carrier. Each sub-carrier is modulated with a modulation scheme at a low symbol rate, maintaining total data rates similar to conventional single-carrier modulation schemes in the same bandwidth.

An OFDM system uses several carriers, or "tones," for functions including data, pilot, guard, and nulling. Data tones are used to transfer information between the transmitter and receiver via one of the channels. Pilot tones are used to maintain the channels, and may provide information about time/frequency and channel tracking. Guard interval may be inserted between symbols such as the short training field (STF) and long training field (LTF) symbols during transmission to avoid inter-symbol interference (ISI), which might result from multi-path distortion. Guard tones help the signal conform to a spectral mask. The nulling of the direct component (DC) may be used to simplify direct conversion receiver designs.

In some embodiments, the communications device 1010 optionally comprises a Digital Beam Former (DBF) 1022, as indicated by the dashed lines. The DBF 1022 transforms information signals into signals to be applied via the radio 1023, 1043 to elements of an antenna array 1024. The antenna array 1024 is an array of individual, separately excitable antenna elements. The signals applied to the elements of the antenna array 1024 cause the antenna array 1024 to radiate one to four spatial channels. Each spatial channel so formed may carry information to one or more of the communications devices 1030, 1050, and 1055. Similarly, the communications device 1030 comprises a transceiver 1040 to receive and transmit signals from and to the communications device 1010. The transceiver 1040 may comprise an antenna array 1044 and, optionally, a DBF 1042.

Figure 2:
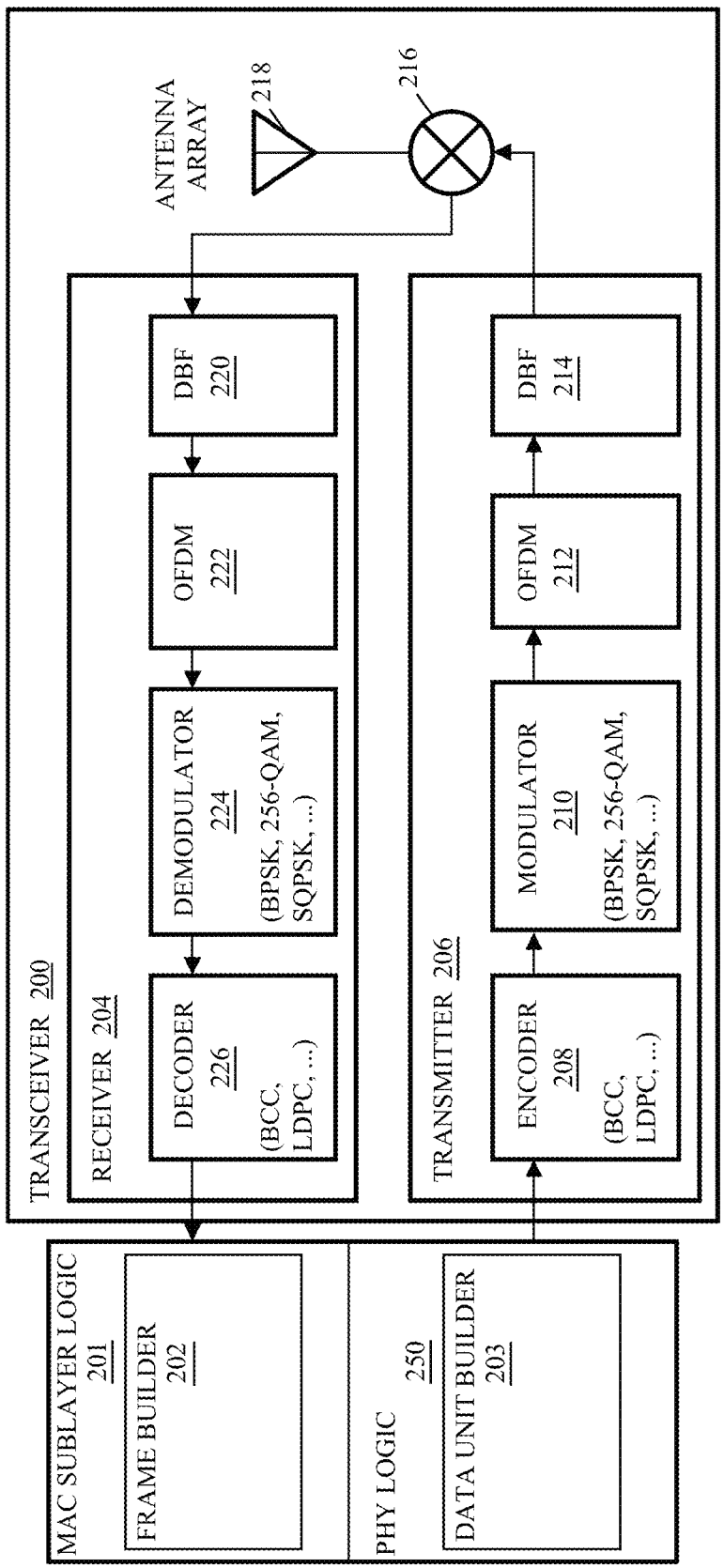
FIG. 2 depicts an embodiment of an apparatus for frequency selective transmission.

FIG. 2 depicts an embodiment of an apparatus to generate, communicate, transmit, receive, communicate, and interpret a frame. The apparatus comprises a transceiver 200 coupled with medium access control (MAC) sublayer logic 201. The MAC sublayer logic 201 may determine a frame such as an association request frame, an association response frame, or a beacon frame, and transmit the frame to the physical layer (PHY) logic 250. The PHY logic 250 may determine the PPDU by determining a preamble and encapsulating the frame with a preamble to transmit via transceiver 200.

In many embodiments, the MAC sublayer logic 201 may comprise a frame builder 202 to generate frames (MPDUs). For embodiments such as communications devices that associate with an access point, the MAC sublayer logic 201 may generate an association request that includes fields descriptive of capabilities of the communications device. The MAC sublayer logic 201 may then receive and parse and interpret an association response frame to determine the slot times defined for the communications device. For embodiments such as access points, the MAC sublayer logic 201 may comprise a frame builder 202 to generate an association response frame to define slot times, RAWs, TWTs, hopping schedules, or the like for communications between other communications devices and the access point.

The PHY logic 250 may comprise a data unit builder 203. The data unit builder 203 may determine a preamble and the PHY logic 250 may encapsulate the MPDU with the preamble to generate a PPDU. In many embodiments, the data unit builder 203 may create the preamble based upon communications parameters chosen through interaction with a destination communications device.

The transceiver 200 comprises a receiver 204 and a transmitter 206. The transmitter 206 may comprise one or more of an encoder 208, a modulator 210, an OFDM 212, and a DBF 214. The encoder 208 of transmitter 206 receives and encodes data destined for transmission from the MAC sublayer logic 202 with, e.g., a binary convolutional coding (BCC), a low density parity check coding (LDPC), and/or the like. The modulator 210 may receive data from encoder 208 and may impress the received data blocks onto a sinusoid of a selected frequency via, e.g., mapping the data blocks into a corresponding set of discrete amplitudes of the sinusoid, or a set of discrete phases of the sinusoid, or a set of discrete frequency shifts relative to the frequency of the sinusoid. The output of modulator 210 is fed to an orthogonal frequency division multiplexer (OFDM) 212, which impresses the modulated data from modulator 210 onto a plurality of orthogonal subcarriers. And, the output of the OFDM 212 may be fed to the digital beam former (DBF) 214 to form a plurality of spatial channels and steer each spatial channel independently to maximize the signal power transmitted to and received from each of a plurality of user terminals.

The transceiver 200 may also comprise duplexers 216 connected to antenna array 218. Thus, in this embodiment, a single antenna array is used for both transmission and reception. When transmitting, the signal passes through duplexers 216 and drives the antenna with the up-converted information-bearing signal. During transmission, the duplexers 216 prevent the signals to be transmitted from entering receiver 204. When receiving, information bearing signals received by the antenna array pass through duplexers 216 to deliver the signal from the antenna array to receiver 204. The diplexers 216 then prevent the received signals from entering transmitter 206. Thus, duplexers 216 operate as switches to alternately connect the antenna array elements to the receiver 204 and the transmitter 206.

The antenna array 218 radiates the information bearing signals into a time-varying, spatial distribution of electromagnetic energy that can be received by an antenna of a receiver. The receiver can then extract the information of the received signal.

The transceiver 200 may comprise a receiver 204 for receiving, demodulating, and decoding information bearing signals. The receiver 204 may comprise one or more of a DBF 220, an OFDM 222, a demodulator 224 and a decoder 226. The received signals are fed from antenna elements 218 to a Digital Beam Former (DBF) 220. The DBF 220 transforms N antenna signals into L information signals. The output of the DBF 220 is fed to the OFDM 222. The OFDM 222 extracts signal information from the plurality of subcarriers onto which information-bearing signals are modulated. The demodulator 224 demodulates the received signal, extracting information content from the received signal to produce an un-demodulated information signal. And, the decoder 226 decodes the received data from the demodulator 224 and transmits the decoded information, the MPDU, to the MAC sublayer logic 201.

After receiving a frame, the MAC sublayer logic 201 may access frame structures in memory to parse the frame to determine, e.g., whether the access point is buffering data for the communications device, the bit position of the bit, the beacon sequence number, and/or the like. Based upon this information, the MAC sublayer logic 201 may determine a slot time for communicating with an access point. The MAC sublayer logic 201 may communicate with the access point by transmitting a trigger frame to trigger the access point to transmit the data being buffered for the communications device by the access point to the communications device. In several embodiments, the MAC sublayer logic 201 may implement frequency select transmission logic such as the frequency select transmission logic 1015 and 1035 described in conjunction with FIGS. 1 and 1A-1J.

Persons of skill in the art will recognize that a transceiver may comprise numerous additional functions not shown in FIG. 2 and that the receiver 204 and transmitter 206 can be distinct devices rather than being packaged as one transceiver. For instance, embodiments of a transceiver may comprise a Dynamic Random Access Memory (DRAM), a reference oscillator, filtering circuitry, synchronization circuitry, an interleaver and a deinterleaver, possibly multiple frequency conversion stages and multiple amplification stages, etc. Further, some of the functions shown in FIG. 2 may be integrated. For example, digital beam forming may be integrated with orthogonal frequency division multiplexing. In some embodiments, for instance, the transceiver 200 may comprise one or more processors and memory including code to perform functions of the transmitter 206 and/or receiver 204.

FIGS. 3A-B depicts an embodiment of a flowchart 300 for frequency selective transmission as discussed in conjunction with FIGS. 1-2. In particular, FIG. 3A describes a process of frequency selective transmission by an AP. The flowchart 300 begins with transmitting packets wirelessly on sub-channels of a wide bandwidth channel (element 305). In many embodiments, transmitting the packets comprises transmitting sounding packets across all of the sub-channels of the wide bandwidth channel during a sounding period. In some embodiments, transmitting the packets comprises transmitting synch frames across the sub-channels during a sounding period. In further embodiments, transmitting the packets comprises transmitting the beacons.

After transmitting the packets, the AP may receive a selection of a sub-channel from a receiving communications device (element 310). In some embodiments, receiving a selection comprises receiving a power saving poll or other trigger frame. In further embodiments, receiving a selection comprises receiving a communication from the communications device via the selected sub-channel.

After receiving the selection of the sub-channel, the AP may communicate with the receiving communications device via the sub-channel (element 315). For instance, the STA may transmit a data frame during a data phase of a RAW and the AP may respond with an ACK. In further embodiments, the STA may transmit a ready-to-send (RTS) frame, the AP may respond with a clear-to-send (CTS) frame, and then the STA may transmit data to the AP. In another embodiment, all the sub-channels may be reserved for the data exchange time slot and the STA may transmit one or more data frames to the AP within the time slot.

FIG. 3B describes a process of frequency selective transmission by a STA associated with an AP. The flowchart 300 begins with receiving packets wirelessly on sub-channels of a wide bandwidth channel (element 355). In some embodiments, the AP may transmit the packets simultaneously, multiple times in succession during a sounding period. In such embodiments, the STA may receive the packets either simultaneously or sequentially by changing sub-channels between receipt of each of the packets. In several embodiments, the determination regarding whether to receive the packets simultaneously or sequentially may be based upon receiver capabilities or may be based upon the power consumption of receiving the packets sequentially versus the power consumption of receiving the packets simultaneously.

After receiving the packets, the STA may transmit a selection of a sub-channel to the AP (element 360). In several embodiments, the STA may transmit the selection of the sub-channel to the AP on the primary sub-channel or a default sub-channel for communications with the AP. In such embodiments, the STA may transmit a frame such as a PS-Poll frame to the AP and the PS-Poll frame may comprise an index for the selected sub-channel to identify the selected sub-channel to the AP. In further embodiments, the STA may transmit a frame on the selected sub-channel and the AP can determine the selected cub-channel based upon receipt of the frame rather than parsing the frame to determine the index.

The STA may communicate with the AP via the sub-channel (element 365). In some embodiments, the process of identifying the sub-channel to the AP and communicating, e.g., a data frame to the AP occurs at the same time. In other words, the communication of a frame such as the data frame on the selected sub-channel serves as the identification of the sub-channel to the AP.

FIGS. 4A-C depicts an embodiment of a flowchart for frequency selective transmission as discussed in conjunction with FIGS. 1-2. In particular, FIG. 4A depicts a flowchart 400 of a restricted access window (RAW) embodiment. The flowchart 400 begins with the AP assigning time slots to the STAs through transmission of a beacon (element 405). The flowchart 400 may describe the actions occurring during a beacon interval, which may be the time interval between transmissions of beacons by the AP to the associated STAs. In many embodiments, the AP may utilize the beacons to reserve a time duration (T) for the PS-Poll/trigger phase and each STA may transmit a PS-Poll to the AP during their assigned time slot within the Poll/trigger phase. In several embodiments, the AP may utilize the beacons to transmit assignments for time slots during the data exchange phase of the beacon interval to the STAs.

The AP may then allocate a time slot for sounding period and transmit sounding packets over all sub-channels (e.g. eight 2 MHz channels of a 16 MHz bandwidth channel) (element 410). In several embodiments, the sounding packets may be transmitted simultaneously on all sub-channels during the sounding period and, in some of these embodiments, the sounding packets may be transmitted across all sub-channels simultaneously multiple times so the STAs can choose whether to receive the sounding packets frames sequentially or simultaneously. In other embodiments, the sounding packets may be transmitted sequentially on all sub-channels of the bandwidth.

After the AP transmits the sounding packets, the STAs may receive the sounding packets during the sounding period and each STA may choose a sub-channel (element 415). The STAs can receive the sounding packets across all sub-channels either at the same time or sequentially by switching channels after receipt of each of the sounding packets. While receiving the all the sounding packets simultaneously reduces the sounding period or duration, receiving the packets simultaneously requires the STA to have the capability of receiving wide bandwidth communications.

Upon receipt of the sounding packets, each STA may choose the sub-channel based upon a determination as to the best sub-channel for communications. For instance, the STAs may choose a sub-channel based upon the signal-to-noise ratio associated with each channel and/or other criteria.

After selecting a sub-channel, each STA signals the selected sub-channel in a PS-Poll or trigger frame during the PS-Poll/trigger phase of the RAW (element 420). In many embodiments, the STA and the AP can communicate on the primary channel at, e.g., the lowest modulation and coding scheme (MCS) transmission rate for the basic service set. The selected channel index can be signaled by 2-4 bits assuming a sub-channel is selected from 4-16 sub-channels. The AP records the selected sub-channel index for each STA and uses that sub-channel for data exchanges with the STA during the assigned time slot for the STA in the data exchange phase of the RAW.

In other embodiments, the STA selects its best sub-channel and transmits a PS-Poll/trigger frame on that sub-channel. In such embodiments, the STA may not need to signal the selected sub-channel index in the PS-Poll/trigger frame because the AP can determine the selected sub-channel based upon the sub-channel on which the AP received the PS-Poll/trigger frame. Furthermore, in such embodiments, the AP has to be capable of decoding a packet received on any of the sub-channels.

The STA may then communicate with the AP via the sub-channel (element 425). For instance, the STA may transfer sensor data collected by the STA to the AP during the time slot assigned to the STA and over the sub-channel selected by the STA. Note that the selection of the sub-channel may change between different beacon intervals because the STA may select different sub-channels depending upon, e.g., the prior interference patterns associated with communications over the sub-channel from the previous beacon interval during which the STA communicated with the AP.

FIG. 4B depicts a flowchart 400 of a target wake time (TWT) embodiment. The TWT may be a wake time assigned or otherwise associated with a station that is known to the AP. The AP may send packets to a STA and reserve all the sub-channels (element 435). In some embodiments, AP sends control frames such as Short CTS frames (or Synch frames) across all sub-channels either simultaneously or sequentially. All the sub-channels may be reserved for a time duration T to prevent possible hidden node problem until the end of the packet transactions. The time duration T may be, e.g., a maximum transmission operation (TXOP) time duration or an estimated data transmission time duration.

In further embodiments, the AP transmits sounding frames across all sub-channels either simultaneously or sequentially. AP sends sounding frames to a STA at the TWT of the STA. All the sub-channels are reserved through receipt of an RTS frame from the STA to protect transmissions from other STAs. In some embodiments, the RTS frame from the STA may set a network allocation vector (NAV) on the selected sub-channel such that the selected sub-channel is reserved through the end of the packet transmissions between the STA and the AP.

In other embodiments, AP sends sounding frames across all sub-channels to a STA at the TWT of the STA. All the sub-channels are reserved awaiting receipt of a PS-Poll/trigger frame from the STA, an ACK or a response frame from the AP, and an RTS from the STA. All the sub-channels are reserved during this period of time to protect transmissions from other STAs.

In response, the STA may select a sub-channel (element 440). In several embodiments, the STA selects a sub-channel based on the sounding frames, the control frames, and determinations related to the quality of the sub-channel for the purposes of communications between the STA and the AP.

The STA may then communicate the selection and communicate on the selected sub-channel with the AP (element 445). In some embodiments, the AP is capable of decoding a packet received on any sub-channel and the unselected sub-channels during T are wasted. In many embodiments, the STA sends an RTS on the selected sub-channel. The RTS may set the NAV of other STAs on the selected sub-channel. After transmitting the RTS, the STA may open its receive (RX) chain only for the selected sub-channel. The AP may reply with a CTS on the selected sub-channel. And the AP opens its RX chain only for the selected sub-channel.

Once the RTS and CTS are transmitted, the AP and the STA may exchange Data frames and ACK frames on the selected sub-channel. The unselected sub-channels can be used by Optimal Base Station Scheduler (OBSS) STAs after the end of the RTS frame transmitted by the STA.

In further embodiments, PS-Poll and the response frame contains the selected sub-channel index. The STA selects a sub-channel based on the sounding frames and sends an RTS on the selected sub-channel. The RTS sets the NAV of the other STAs on the selected sub-channel.

After transmitting the RTS on the selected sub-channel, the STA opens its RX chain only for the selected sub-channel. The AP replies with a CTS on the selected sub-channel. And the AP opens its Rx chain only for the selected sub-channel. Thereafter, the AP and the STA may exchange Data frames and ACK frames on the selected sub-channel and the unselected sub-channels can be used by OBSS STAs after the end of the transmission of the RTS frame by the STA.

FIG. 4C depicts a flowchart 400 of a sub-channel hopping embodiment. The flowchart 450 begins with the AP transmitting a beacon each beacon interval on a primary sub-channel comprising a hopping schedule for the AP (element 455). The hopping schedule may detail the time slots in which or slot boundaries at which the AP cycles through N sub-channels periodically. Hopping schedules of OBSSs may be coordinated to better utilize sub-channels.

A sounding period may follow a beacon or beacons can be used as sounding packets (element 465). For instance, in some embodiments, rather than presenting a sounding period, beacon transmissions may be repeated on each sub-channel during a beacon interval. In other embodiments, the sounding period may be allocated and the AP may transmit sounding packets on all the sub-channels. In further embodiments, the AP may both transmit the sounding packets during the sounding period and transmit beacons on each of the sub-channels during the beacon interval.

In response to receiving the sounding packets and/or one or more beacons on one or more of the sub-channels, the STA selects a sub-channel (element 465). For instance, in response to receiving the sounding packets and/or one or more of the beacons, a STA estimates channel quality of each sub-channel during the sounding period or based on the beacons. When using beacons for channel estimation, the STA may determines that the channel quality is good enough to use, i.e., meets certain minimum quality criteria for communications such as bit error rates, based on the received beacon on the sub-channel. If the STA decides that the channel quality is good enough, e.g., meets one or more particular quality standards, the STA may decide to stay on that sub-channel and access the channel. Otherwise, the STA may move on to the next sub-channel on which the AP is scheduled to stay for a time duration.

The STA may access or communicate via the sub-channel when the AP is on that sub-channel (element 475). In further embodiments, the AP may adjust time durations associated with each of the time slots during which the AP remains on a sub-channel based on the traffic loads associated with the sub-channels. For instance, if a first sub-channel repeatedly has a higher traffic load than the other sub-channels, the AP may increase the time duration of the time slot of the beacon interval allocated for the first sub-channel and decrease the time duration of the time slots for one or more of the other sub-channels that have less traffic.

The following examples pertain to further embodiments. One example comprises a method. The method may involve transmitting packets, by an access point during a beacon interval, wirelessly on sub-channels of a wide bandwidth channel; receiving a selection of a selected sub-channel from a communications device; and communicating with the communications device via the sub-channel.

In some embodiments, the method may further comprise transmitting a beacon to communicate a hopping schedule to the communications device during the beacon interval. In some embodiments, the method may further comprise transmitting a beacon to communicate a time slot assignment to the communications device during the beacon interval. In many embodiments, the method may further comprise transmitting a management frame to communicate a target wake time to the communications device. In several embodiments, transmitting the packets comprises transmitting sounding packets across all of the sub-channels of the wide bandwidth channel during a sounding period. In some embodiments, transmitting the packets comprises transmitting synch frames across the sub-channels during a sounding period. In some embodiments, transmitting the packets comprises transmitting the beacons. In some embodiments, receiving a selection comprises receiving a power saving poll or other trigger frame. And, in some embodiments, receiving a selection comprises receiving a communication the communications device via the selected sub-channel.

At least one computer program product for communication of a packet with a frame, the computer program product comprising a computer useable medium having a computer useable program code embodied therewith, the computer useable program code comprising computer useable program code configured to perform operations, the operations to carry out a method according to any one or more or all of embodiments of the method described above.

At least one system comprising hardware and code may carry out a method according to any one or more or all of embodiments of the method described above.

Another example comprises an apparatus. The apparatus may comprise logic to transmit packets, by an access point during a beacon interval, wirelessly on sub-channels of a wide bandwidth channel; receive a selection of a selected sub-channel from a communications device; and communicate with the communications device via the sub-channel; a physical layer in communication with the logic to transmit the packets.

In some embodiments, the apparatus may further comprise an antenna to transmit and memory coupled with the logic to store frames to communicate with the communications device. In some embodiments, the logic comprises medium access control logic to transmit a beacon to communicate a hopping schedule to the communications device during the beacon interval. In some embodiments, the logic comprises medium access control logic to transmit a beacon to communicate a time slot assignment to the communications device during the beacon interval. In some embodiments, logic comprises medium access control logic to transmit sounding packets across the sub-channels of the wide bandwidth channel during a sounding period. And in some embodiments of the apparatus, the logic comprises medium access control logic to transmit synch frames across all of the sub-channels during a sounding period.

Another example comprises a system. The system may logic to transmit packets, by an access point during a beacon interval, wirelessly on sub-channels of a wide bandwidth channel; receive a selection of a selected sub-channel from a communications device; and communicate with the communications device via the sub-channel; a physical layer in communication with the logic to transmit the packets; and an antenna to transmit and memory coupled with the logic to store frames to communicate with the communications device.

Another example comprises a program product. The program product for frequency selective transmission may comprise a storage medium comprising instructions to be executed by a processor-based device, wherein the instructions, when executed by the processor-based device, perform operations, the operations comprising: transmitting packets, by an access point during a beacon interval, wirelessly on sub-channels of a wide bandwidth channel; receiving a selection of a selected sub-channel from a communications device; and communicating with the communications device via the sub-channel.

Another example comprises a method. The method may involve receiving, by a communications device, packets wirelessly on sub-channels of a wide bandwidth channel; determining a selected sub-channel by the communications device; and communicating with the receiving communications device via the selected sub-channel.

In some embodiments, the method may further comprise receiving a beacon comprising a hopping schedule for an access point during the beacon interval. In some embodiments, the method may further comprise receiving a beacon comprising a time slot assignment for the communications device during the beacon interval. In many embodiments, the method may further comprise receiving a management frame comprising a target wake time for the communications device. In several embodiments, receiving the packets comprises receiving sounding packets across all of the sub-channels during a sounding period of the beacon interval. In some embodiments, receiving the packets comprises receiving synch frames across the sub-channels during a sounding period of the beacon interval. In some embodiments, receiving the packets comprises receiving beacons on the sub-channels. And, in some embodiments, communicating with the receiving communications device via the selected sub-channel comprises transmitting a PS-Poll or trigger frame to the access point to select the selected sub-channel.

At least one computer program product for frequency selective transmission, the computer program product comprising a computer useable medium having a computer useable program code embodied therewith, the computer useable program code comprising computer useable program code configured to perform operations, the operations to carry out a method according to any one or more or all of embodiments of the method described above.

At least one system comprising hardware and code may carry out a method according to any one or more or all of embodiments of the method described above.

Another example comprises an apparatus. The apparatus may comprise logic to receive packets wirelessly from an access point on sub-channels of a wide bandwidth channel; determine a selected sub-channel to communicate with the access point; and communicate with the access point via the selected sub-channel; and a physical layer in communication with the logic to receive the packets.

In some embodiments, the apparatus may further comprise an antenna coupled with the physical layer logic to transmit the communication, wherein the logic comprises medium access control logic to receive a beacon comprising a time slot assignment from the access point during the beacon interval. In some embodiments, the logic comprises medium access control logic to transmit a beacon comprising a hopping schedule from the access point during the beacon interval.

Another example comprises a system. The system may comprise logic to receive packets wirelessly from an access point on sub-channels of a wide bandwidth channel; determine a selected sub-channel to communicate with the access point; and communicate with the access point via the selected sub-channel; and a physical layer in communication with the logic to receive the packets; and an antenna coupled with memory.

Another example comprises a program product. The program product for frequency selective transmission may comprise a storage medium comprising instructions to be executed by a processor-based device, wherein the instructions, when executed by the processor-based device, perform operations, the operations comprising: receiving, by a communications device, packets wirelessly on sub-channels of a wide bandwidth channel; determining a selected sub-channel by the communications device; and communicating with the receiving communications device via the selected sub-channel.

In some embodiments of the program product, the operations further comprise receiving a beacon comprising a hopping schedule for an access point during the beacon interval. And in some embodiments, the operations further comprise receiving a beacon comprising a time slot assignment for the communications device during the beacon interval.

In some embodiments, some or all of the features described above and in the claims may be implemented in one embodiment. For instance, alternative features may be implemented as alternatives in an embodiment along with logic or selectable preference to determine which alternative to implement. Some embodiments with features that are not mutually exclusive may also include logic or a selectable preference to activate or deactivate one or more of the features. For instance, some features may be selected at the time of manufacture by including or removing a circuit pathway or transistor. Further features may be selected at the time of deployment or after deployment via logic or a selectable preference such as a dipswitch or the like. A user after via a selectable preference such as a software preference, an e-fuse, or the like may select still further features.

A number of embodiments may have one or more advantageous effects. For instance, some embodiments may offer reduced MAC header sizes with respect to standard MAC header sizes. Further embodiments may include one or more advantageous effects such as smaller packet sizes for more efficient transmission, lower power consumption due to less data traffic on both the transmitter and receiver sides of communications, less traffic conflicts, less latency awaiting transmission or receipt of packets, and the like.

Another embodiment is implemented as a program product for implementing systems, apparatuses, and methods described with reference to FIGS. 1-4. Embodiments can take the form of an entirely hardware embodiment, a software embodiment implemented via general purpose hardware such as one or more processors and memory, or an embodiment containing both specific-purpose hardware and software elements. One embodiment is implemented in software or code, which includes but is not limited to firmware, resident software, microcode, or other types of executable instructions.

Furthermore, embodiments can take the form of a computer program product accessible from a machine-accessible, computer-usable, or computer-readable medium providing program code for use by or in connection with a computer, mobile device, or any other instruction execution system. For the purposes of this description, a machine-accessible, computer-usable, or computer-readable medium is any apparatus or article of manufacture that can contain, store, communicate, propagate, or transport the program for use by or in connection with the instruction execution system or apparatus.

The medium may comprise an electronic, magnetic, optical, electromagnetic, or semiconductor system medium. Examples of a machine-accessible, computer-usable, or computer-readable medium include memory such as volatile memory and non-volatile memory. Memory may comprise, e.g., a semiconductor or solid-state memory like flash memory, magnetic tape, a removable computer diskette, a random access memory (RAM), a read-only memory (ROM), a rigid magnetic disk, and/or an optical disk. Current examples of optical disks include compact disk-read only memory (CD-ROM), compact disk-read/write memory (CD-R/W), digital video disk (DVD)-read only memory (DVD-ROM), DVD-random access memory (DVD-RAM), DVD-Recordable memory (DVD-R), and DVD-read/write memory (DVD-R/W).

An instruction execution system suitable for storing and/or executing program code may comprise at least one processor coupled directly or indirectly to memory through a system bus. The memory may comprise local memory employed during actual execution of the code, bulk storage such as dynamic random access memory (DRAM), and cache memories which provide temporary storage of at least some code in order to reduce the number of times code must be retrieved from bulk storage during execution.

Input/output or I/O devices (including but not limited to keyboards, displays, pointing devices, etc.) can be coupled to the instruction execution system either directly or through intervening I/O controllers. Network adapters may also be coupled to the instruction execution system to enable the instruction execution system to become coupled to other instruction execution systems or remote printers or storage devices through intervening private or public networks. Modem, Bluetooth™, Ethernet, Wi-Fi, and WiDi adapter cards are just a few of the currently available types of network adapters.

What is claimed is:

1. An apparatus, comprising:
   a transceiver; and
   a station (STA) comprising logic, at least a portion of which is in hardware, the logic to receive a beacon to indicate a schedule for transmission of a set of sounding frames for frequency selective transmission channel estimation in a Wireless Fidelity (Wi-Fi) network, receive the set of sounding frames, select a subchannel based on the received set of sounding frames, and send a power-saving poll (PS-Poll) frame to indicate the selected subchannel.

2. The apparatus of claim 1, the logic to receive the set of sounding frames in parallel.

3. The apparatus of claim 1, the logic to receive the set of sounding frames in series.

4. The apparatus of claim 1, the logic to determine whether to receive the set of sounding frames in series or in parallel based on the beacon.

5. The apparatus of claim 1, the logic to send the PS-Poll frame over a primary channel of a basic service set (BSS).

6. The apparatus of claim 5, the logic to send the PS-Poll frame at a lowest modulation and coding scheme (MCS) transmission rate for the BSS.

7. The apparatus of claim 1, the logic to send the PS-Poll frame over the selected subchannel.

8. The apparatus of claim 7, the sending of the PS-Poll frame over the selected subchannel indicating the selected subchannel.

9. The apparatus of claim 1, the logic to send the PS-Poll frame during a reserved access window (RAW) for subchannel selection.

10. The apparatus of claim 1, the logic to receive a frame over the selected subchannel in response to the PS-Poll frame.

11. The apparatus of claim 1, the logic to send a frame over the selected subchannel during a time allocated for data exchange.

12. The apparatus of claim 1, the logic to receive the set of sounding frames during a time slot reserved for transmission of the sounding frames.

13. The apparatus of claim 1, the logic to receive beacons over more than one subchannel in series.

14. The apparatus of claim 1, the beacon to indicate a frequency hopping schedule of an access point (AP).

15. The apparatus of claim 1, the logic to receive the set of sounding frames at a target wake time (TWT) for the STA.

16. The apparatus of claim 1, the selected subchannel comprising a 1 MHz, 2 MHz, 4 MHz, or 8 MHz subchannel.

17. The apparatus of claim 1, the logic to select the selected subchannel from among a plurality of subchannels of a 4 MHz, 8 MHz, or 16 MHz bandwidth.

18. The apparatus of claim 1, comprising:
a memory; and
at least one radio.

19. The apparatus of claim 18, comprising at least one antenna.

20. An apparatus, comprising:
a transceiver; and
an access point (AP) comprising logic, at least a portion of which is in hardware, the logic to send a beacon to indicate a schedule for transmission of a set of sounding frames for frequency selective transmission channel estimation in a Wireless Fidelity (Wi-Fi) network, send the set of sounding frames according to the schedule, and receive a subchannel selection in response to the set of sounding frames, the subchannel selection to indicate a selected subchannel for a station (STA).

21. The apparatus of claim 20, the logic to send the set of sounding frames in parallel.

22. The apparatus of claim 20, the logic to send the set of sounding frames in series.

23. The apparatus of claim 20, the logic to allocate a reserved access window (RAW) for receipt of the subchannel selection.

24. The apparatus of claim 20, the subchannel selection comprising a power-saving poll (PS-Poll) frame.

25. The apparatus of claim 20, the logic to identify the selected subchannel as a subchannel over which the subchannel selection is received.

26. The apparatus of claim 20, the logic to receive the subchannel selection over a primary channel of a basic service set (BSS) of the AP.

27. The apparatus of claim 26, the logic to receive the subchannel selection at a lowest modulation and coding scheme (MCS) transmission rate for the BSS.

28. The apparatus of claim 20, the logic to reserve a time slot for transmission of the set of sounding frames.

29. The apparatus of claim 20, the logic to send a frame over the selected subchannel.

30. The apparatus of claim 20, the logic to send beacons on more than one channel in parallel.

31. The apparatus of claim 20, the logic to send beacons on more than one channel in series.

32. The apparatus of claim 20, the beacon to indicate a frequency hopping schedule for the AP.

33. The apparatus of claim 20, the logic to send the set of sounding frames at a target wake time (TWT) for the STA.

34. The apparatus of claim 33, the logic to reserve the selected subchannel using a network allocation vector (NAV).

35. The apparatus of claim 20, the sounding frames comprising clear-to-send (CTS) frames.

36. The apparatus of claim 20, the selected subchannel comprising a 1 MHz, 2 MHz, 4 MHz, or 8 MHz subchannel.

37. The apparatus of claim 20, the selected subchannel comprising one of a plurality of subchannels of a 4 MHz, 8 MHz, or 16 MHz operating bandwidth of the AP.

38. The apparatus of claim 20, comprising:
a memory; and
at least one radio.

39. The apparatus of claim 38, comprising at least one antenna.

* * * * *